United States Patent [19]

Itoh et al.

[11] Patent Number: 5,799,275

[45] Date of Patent: Aug. 25, 1998

[54] SPEECH RECOGNIZING DEVICE AND METHOD ASSUMING A CURRENT FRAME IS AN END POINT OF A CURRENT REFERENCE PATTERN

[75] Inventors: Yoshiaki Itoh, Tokyo; Jiro Kiyama, Chiba; Hiroshi Kojima, Kawasaki; Susumu Seki, Chiba; Ryuichi Oka, Tsukuba, all of Japan

[73] Assignees: The Japan Iron and Steel Federation, Tokyo; Sharp Kabushiki Kaisha, Osaka; Real World Computing Partnership, Tokyo, all of Japan

[21] Appl. No.: 665,502

[22] Filed: Jun. 18, 1996

[30] Foreign Application Priority Data

Jun. 22, 1995 [JP] Japan ................... 7-156539

[51] Int. Cl.⁶ ........................................... G10L 3/00
[52] U.S. Cl. .................. 704/241; 704/238; 704/244; 704/248; 704/252
[58] Field of Search .................... 704/238, 236, 704/239, 241, 244, 246, 248, 251, 252, 243

[56] References Cited

U.S. PATENT DOCUMENTS

| | | | |
|---|---|---|---|
| 4,049,913 | 9/1977 | Sakoe | 704/241 |
| 4,286,115 | 8/1981 | Sakoe | 704/248 |
| 4,783,806 | 11/1988 | Nakamura et al. | 704/239 |
| 4,783,809 | 11/1988 | Glinski | 704/244 |
| 4,794,645 | 12/1988 | Watari | 704/239 |
| 4,882,756 | 11/1989 | Watari | 704/241 |
| 4,901,352 | 2/1990 | Watari | 704/238 |
| 5,121,465 | 6/1992 | Sakoe | 704/236 |
| 5,309,547 | 5/1994 | Niyada et al. | 704/236 |

FOREIGN PATENT DOCUMENTS 6-161488  6/1994  Japan ................... G10L 3/00

OTHER PUBLICATIONS

Fissore et al., ("Analysis and Improvement of the Partial Distance Search Algorithm", ICASSP'93: Acoustics Speech & Signal Processing Conference, Apr. 1993, vol.II, pp. 315–318).

Itoh et al., ("Sentence Spotting applied tp Partial Sentences and Unknown Words", ICASSP'94: Acoustics, Speech & Signal Processing Conference, Apr. 1994, vol.I, pp. 369–372).

"Method for Partial Sentence Recognition and Unknown Words Detection by Sentence Spotting in Continuous Speech", D–II, J77–D–II, No. 8 (1994–8); Y. Itoh et al.

*Primary Examiner*—David R. Hudspeth
*Assistant Examiner*—Vijay B. Chawan

[57] ABSTRACT

A speech recognition system automatically designates a scope of a partial reference pattern. Plural reference patterns, each of which ends in each of composing frames and starts from a preceding frame, are supposed and cumulative distances at every frame are calculated. A partial reference pattern that has a minimal distance value as compared with all other partial reference patterns is taken as a partial input speech recognizing result.

9 Claims, 12 Drawing Sheets

POSSIBILITY OF A PAUSE BETWEEN TOPICS IS HIGH

SPEECH RECOGNIZING DEVICE AND METHOD ASSUMING A CURRENT FRAME IS AN END POINT OF A CURRENT REFERENCE PATTERN

BACKGROUND OF THE INVENTION

The present invention relates to a speech recognizing device and method for recognizing input speech and, more particularly, to a speech recognizing device and method for extracting a time-series feature-parameter from sequentially input voice signals, calculating a distance between the extracted time-series feature-parameter and time-series known feature (e.g., phoneme) parameter of a reference pattern by using continuous dynamic programming (DP) method and recognizing a partial speech sentence, for example, a word in the process of recognizing a speech sentence by detecting a time-series feature-parameter of a reference pattern at which a shortest distance between both parameters is measured.

In the material of Y. Itoh, J. Kiyama and R. Oka: "methods for partial sentence recognition and unknown words detection by sentence spotting in continuous speech", D-II, J77-D-II, No. 8 (1994-8), there is proposed a method for recognizing a partial spoken sentence, e.g., a word in the process of speech recognition per spoken sentence, i.e., sentence-spotted speech recognition by the continuous DP method.

This method recognizes a partial speech sentence by simultaneously determining the consistency of a predetermined segment of a reference pattern represented by continuous words with an input speech in a process of calculating operation on a whole reference pattern.

The above-mentioned method, however, requires a user to manually specify a scope of a partial spoken sentence to calculate its distance.

SUMMARY OF THE INVENTION

It is an object of the present invention to provide a speech recognizing device and method for automatically obtaining a distance between a reference pattern of any partial sentence and a spoken input.

It is another object of the present invention to provide a speech recognizing device and method for recognizing words during speech recognition of a sentence and for eliminating the need for manually designating a partial reference pattern as the prior art requires.

It is another object of the present invention to provide a speech recognizing device and method for realizing word-by-word recognition omitting character recognition by increasing the number of frames to be extracted as partial reference patterns (templates) more than the specified number.

It is another object of the present invention to provide a speech recognizing device and method for obtaining a partial sentence composed of a plurality of the same words included in an input speech pattern of a specified length as a result of partial speech recognition by preparing a reference pattern from an input speech pattern.

It is another object of the present invention to provide a speech recognizing device and method for using a FIFO type memory as a buffer, that may save a memory capacity.

It is another object of the present invention to provide a speech recognizing device and method for synthesizing results of partial speech pattern recognition into one synthesis which content may be handled as a summary of a speech or a group of key words.

It is another object of the present invention to provide a speech recognizing device and method for enabling hearer to recognize by ears a speaker's speech summary by means of voice reproduction of the synthesized content.

It is another object of the present invention to provide a speech recognizing device and method for detecting automatically a break in a speaker's speech.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

PREFERRED EMBODIMENT OF THE INVENTION

Figure 1:
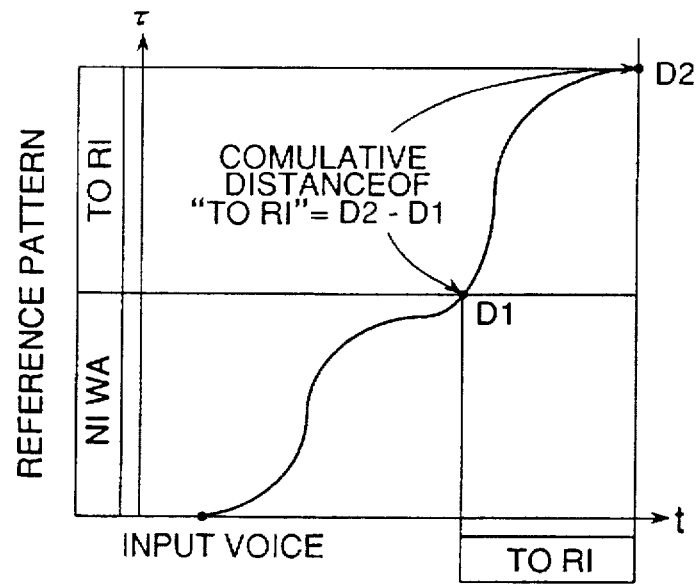
FIG. 1 is a view for explaining a conventional method for obtaining a cumulative distance of a partial reference pattern.

FIG. 1 is a view for explaining a conventional method mentioned above in Y. Ito et al. for obtaining a cumulative distance of a partial reference pattern. In the FIG. 1, horizontal axis represents an input speech which content is expressed by characters and the vertical axis represents a reference pattern which content is expressed by characters. Although practical speech recognition performs matching a reference pattern with an input speech by using a sequence of so called feature parameters which are speech features extracted from an input speech in a specified unit time and arranged according to the time series, the following description will be made by using characters for easier understanding.

Figure 2:
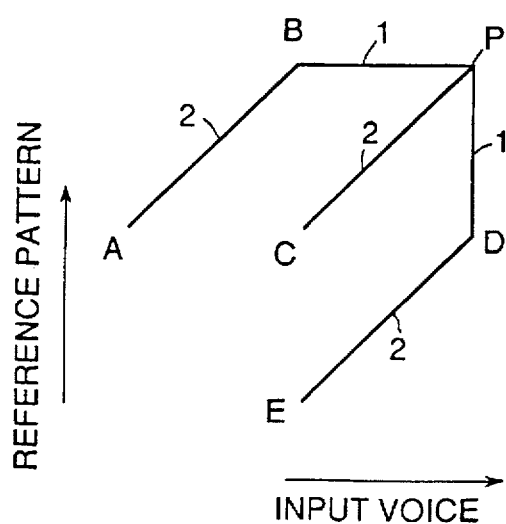
FIG. 2 is a view for explaining a continuous DP method.

It is supposed that a reference pattern (template) is ⌈NIWATORIJ⌋ and segments are specified as ⌈NIWA⌋ and ⌈TORI⌋. When a voice ⌈NI⌋ is input, calculation of distances is conducted in all combinations. For example, a distance between ⌈NI⌋ of the reference pattern and the input ⌈NI⌋ and distances from ⌈NI⌋, ⌈WA⌋, ⌈TO⌋ and ⌈RI⌋, respectively, of the reference pattern to the input ⌈NI⌋ are calculated in sequence. When a voice ⌈WA⌋ is input, a distance between ⌈NI⌋ of the reference pattern and the input ⌈WA⌋ and a distance between ⌈WA⌋ and the input ⌈WA⌋ are calculated. The distance calculation results thus obtained are added to the distance calculation results obtained at a preceding point of time. Accumulation of distances calculated at a point of time between a voice input and a segment pattern of a reference pattern to those obtained at preceding points of time can determine an optimal linkage route among the several calculation results. Such a combination of patterns that may absorb time compression or expansion of an input speech and reference pattern as shown in FIG. 2 is usually used. In this example, a shortest cumulative distance is selected among cumulative distances obtained along a path A→B→P, a path C→P and a path E→D→P when a point P is supposed as a cumulative distance between a segment reference pattern ⌈NIWATO⌋ and an input speech ⌈NIWATO⌋. In FIG. 2, a point A represents a cumulative distance between ⌈NIWA⌋ of the reference pattern and ⌈NI⌋ of the input speech and a point C represents a cumulative distance between ⌈NIWA⌋ of the reference pattern and ⌈NIWA⌋ of the input speech. Cumulative distances between various combinations are thus determined for every input speech. A cumulative distance between the reference pattern ⌈NIWATORI⌋ and a current input speech becomes smaller than a threshold when an input speech becomes ⌈NIWA-TORI⌋. At this point of time, the input speech is therefore recognized to be ⌈NIWATORI⌋. The above-mentioned distance calculation (so called calculation according to continuous DP method) is, of course, performed on each of plural reference patterns prepared. By doing so, it is possible to recognize on the spot a sentence matching with a specified reference pattern among a plurality of continuously input spoken sentences.

As shown in FIG. 1, a cumulative distance of the partial sentence ⌈TORI⌋ is determined by subtracting a cumulative distance D1 of ⌈NIWA⌋ from a cumulative distance D1 of ⌈NIWATORI⌋.

The above-mentioned method, however, requires a user to manually specify a scope of a partial spoken sentence to calculate its distance.

Accordingly, the present invention is directed to provide a speech recognizing device and method for automatically obtaining a distance between a reference pattern of any partial sentence and a spoken input.

Referring to the accompanying drawings, preferred embodiments of the present invention will be described as follows:

Embodiment No. 1

A speech recognition method used for this example is as follows:

The following equation (1) expresses a reference pattern sequence R and an input pattern sequence I.

Mathematical Expression 1

$$R = \tau(1), \tau(2), \ldots \tau(r), \ldots \tau(T)$$

$$I = i(-\infty), \ldots i(i) \ldots (\infty)$$

In the expressions, $\tau(r)$ represents r-th feature parameter in a reference pattern sequence and $i(i)$ represents i-th feature parameter in an input pattern In the following description, a unit of a speech is referred to as a frame in which the feature parameter has been obtained and an input time instant is expressed by t. A segment that is common to an input pattern and a reference pattern is defined as follows:

Mathematical Expression 2

$$Rc = \tau(\tau 1), \tau(\tau 1+1), \ldots \tau(\tau 2)$$

$$Ic = i(t1), i(t1+1), \ldots i(t2)$$

Figure 3:
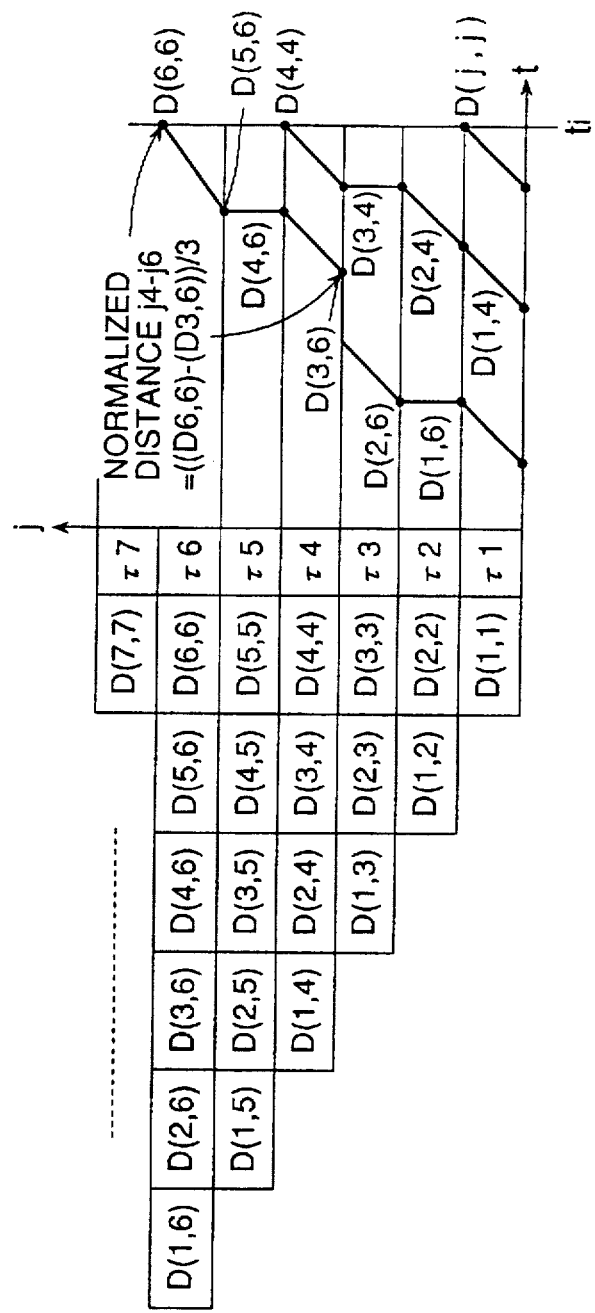
FIG. 3 is a view for explaining a method for obtaining a cumulative distance a partial reference of a first embodiment.

Each frame $\tau(\tau)$ of a reference pattern holds a whole history (hysteresis) of a cumulative distance of a path ending in the frame at a specified time instant. Therefore, a distance of a segment preceding to a current frame is determined as a difference between two histories. By normalizing the segment distance by the number of frames therein it becomes possible to check a matching degree of two segments. In FIG. 3, a normalized distance, for example, from a frame $\tau 3$ to a frame $\tau 6$ at a time t1 is determined as (D(6, 6)−D(6, 3))/3 that can be compared with a normalized distance from $\tau 3$ to $\tau 5$, i.e., (D(5, 5)−D(5, 3))/2. In FIG. 3, $D(\tau 2, \tau 1)$ {$\tau 1 \leq \tau 2$} represents a cumulative distance at a frame $\tau(\tau 1)$ on the path ending in a frame $\tau(\tau 2)$. Accordingly, a matching degree of two optional segments can be effectively determined in the process of continuous DP calculation on a reference pattern for a continuously spoken input. It is also possible to specify the limited number of hysteresis frames as a shortest and a longest duration of a word if necessary.

Figure 4:
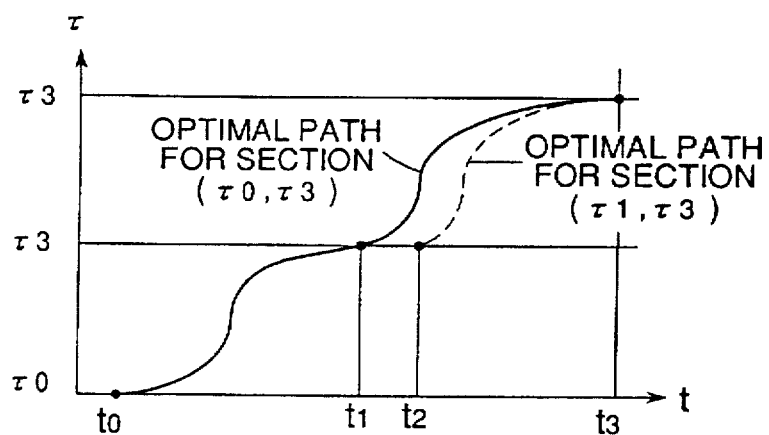
FIG. 4 is a view for explaining the optimality of the first embodiment.

In an optimal path obtained by the continuous DP method, a partial path thereof may have the optimality. In FIG. 4, a partial path from (tj, τj) to (t3, τ3) is optimal if a path from (t0, τ0) to (t3, τ3) is optimal. However, a path from τ1 to τ3 is also optimal if t0 is determined from a free starting position according to the continuous DP method. In this case, the optimality of the path from the frame τ1 to the frame τ3 can not always be assured and an optimal path shown by a dotted line may also exist between frames τ3 and τ3. Namely, the continuous DP method allowing a starting point to be free can not guarantee that a partial path obtained from an optimal path of a whole reference pattern may always be optimal. However, spotting experiments carried-out by the applicant shows that the embodiment can normally work even if partial path is not optimal.

A procedure for calculating a cumulative segment distance based on the above-mentioned principle is as follows:

In FIG. 4, the vertical axis represents a time base $\tau(1 \leq \tau \leq T)$ of a reference pattern and the horizontal axis represents a time base of an input speech. Each frame is designated by $\tau(\tau)$. A local distance between an input speech frame at a time t and a reference pattern frame τ is expressed as d(t, τ).

Any restricted gradient used in the continuous DP calculation has an object-weighted coefficient as shown in FIG. 2. In a path ending in a frame τ2 at a time t, a cumulative distance to a frame t1, a cumulative distance weight coefficient and an input passing time (at which an input passed the frame τ1) are expressed respectively by D(t1, τ2, τ1), $L(t, \tau2, \tau1)$ and $S(t, \tau2, \tau1)$. Consequently, if $D(t, \tau2, 0)$ is 0, a cumulative distance from the frame 0 to the frame $\tau2$ at a time t has an expression of $D(t, \tau2, \tau2)$. A cumulative distance between segments $\tau1$ and $\tau2$ is determined as $D\{(t, \tau2, \tau2) - D(t, \tau2, \tau1-1)\}$. In FIG. 3, $D(\tau1, \tau2)$ is $D(t, \tau1, \tau2)$.

An initial condition is defined as follows:

Mathematical Expression 3

$$D(-1, \tau2, \tau1) = D(0, \tau2, \tau1) = CONST$$

$$L(-1, \tau2, \tau1) = L(0, \tau2, \tau1) = 0$$

$$S(-1, \tau2, \tau1) = S(0, \tau2, \tau1) = -1$$

$$(1 \leq \tau1 \leq \tau2 \leq T)$$

In the expressions, CONST is such a constant value that is so large to obtain a low consistency even by normalizing by the number of longest frames (T). A common segment may become a longest detectable segment if a maximal value of $\tau2$ is set. A recurrence formula that can be used for determining values D, L and S on the frame synchronous condition.

Mathematical Expression 4

When $\tau=1$, $$D(t, 1, 1) = 2d(t, 1),$$

$$L(t, 1, 1) = 2,$$

$$S(t, 1, 1) = t$$

Mathematical Expression 5

When $T \geq 2$, $$P(t, \tau, 1) = D(t-2, \tau-1, \tau-1) + 2 \cdot d(t-1, \tau) + d(t, \tau),$$

$$P(t, \tau, 2) = D(t-1, \tau-1, \tau-1) + 2 \cdot d(t, \tau),$$

$$P(t, \tau, 3) = D(t-1, \tau-2, \tau-2) + 2 \cdot d(t-1, \tau) + d(t, \tau),$$

$$Q(t, \tau, 1) = L(t-2, \tau-1, \tau-1) + 3,$$

$$Q(t, \tau, 2) = L(t-1, \tau-1, \tau1) + 2,$$

$$Q(t, \tau, 3) = L(t-1, \tau-2, \tau-2) + 3.$$

Mathematical Expression 6

But, in case of $\tau=2$, $$P(t, \tau, 3) = D(t, \tau-1, \tau-1) + d(t, \tau) \text{ and}$$

$$Q(t, \tau, 3) = L(t, \tau-1, \tau-1) + 1.$$

Three DP paths (FIG. 2) determined according to the above-mentioned equations are normalized by the following equation for selecting an optimal path among them by comparison.

Mathematical Expression 7

$$\alpha^* = arg \min P(t, \tau, \alpha)/Q(t, \tau, \alpha)$$

$$\alpha = 1, 2, 3$$

A cumulative distance history from the selected optimal path is copied to the frame $\tau$ according to the following equations 8–10 and the cumulative distance and cumulative weight to the frame $\tau$ are updated by using $P(t, \tau, \alpha^*)$ and $Q(t, \tau, \alpha^*)$ according to the equation 11.

Mathematical Expression 8

In case of $\alpha^*=1$, $$D(t, \tau, k) = D(t-2, \tau-1, k)$$

$$S(t, \tau, k) = S(t-2, \tau-1, k) \; 1 \leq k \leq \tau-1$$

$$L(t, \tau, k) = L(t-2, \tau-1, k)$$

Mathematical Expression 9

In case of $\alpha^*=2$, $$D(t, \tau, k) = D(t-1, \tau-1, k)$$

$$S(t, \tau, k) = S(t-1, \tau-1, k) \; 1 \leq k \leq \tau-1$$

$$L(t, \tau, k) = L(t-1, \tau-1, k)$$

Mathematical Expression 10

In case of $\alpha^*=3$, $$D(t, \tau, k) = D(t-1, \tau-2, k)$$

$$S(t, \tau, k) = S(t-1, \tau-2, k) \; 1 \leq k \leq \tau-2$$

$$L(t, \tau, k) = L(t-1, \tau-2, k) \; (if \; \tau \geq 3)$$

$$D(t, \tau, \tau-1) = P(t, \tau, \alpha^*) + d(t, \tau)$$

$$L(t, \tau, \tau-1) = Q(t, \tau, \alpha^*) + 1$$

Mathematical Expression 11

$$D(t, \tau, \tau) = P(t, \tau, \alpha^*)$$

$$L(t, \tau, \tau) = Q(t, \tau, \alpha^*)$$

$$S(t, \tau, \tau) = t$$

Referring to FIG. 3, the above-mentioned equations will be explained as follows:

Cumulative distances and cumulative weights for three respective DP paths to frame $\tau6$ at a time t are determined according to Equation 5 and an optimal one of the three paths, which has a minimal cumulative distance, is selected according to Equation 7. The value $\alpha^*$ is equal to 2 when a DP path starting from a frame 5 at a time t−1 is optimal. A cumulative distance history $D(1, 5)\{t-1\}-D(5, 6)\{t-1\}$ of the frame 5 at the time t−1 is copied to a history $D(1,5)\{t\}-D(5, 6)\{t\}$ according to Equation (10). Namely, a copy is made from $D(t-1, 5, 1)-D(t-1, 5, 5)$ to $D(t, 6, 1)-D(t,6, 5)$ in Equation (10). Finally, the cumulative distance $D(6, 6)\{t\}$ of the selected path is updated. The cumulative weight must be similarly processed.

The above-mentioned DP paths have symmetric weight coefficients as shown in FIG. 2 but it may use asymmetric weight for weighting only in the frame direction, by which values L and Q can be omitted and therefore Equations 7 and 11 can be very simplified as shown Equation 12:

Mathematical Expression 12

$$P(t-2, \tau, 1)$$

$$D(T, \tau, \tau) = \min P(t-1, \tau, 2)$$

$$P(T-1, \tau3)$$

$$D(t, \tau, \tau) = \min \begin{array}{l} P(t-2, \tau, 1) \\ P(t-1, \tau, 2) \\ P(t-1, \tau, 3) \end{array}$$

In this case, only a cumulative distance D is calculated by Equations 8 to 10, thereby assuring considerable saving the necessary capacity of a computer and a memory to be used. A value of Nmax as arestricted longest continuation to be described later is given by adding a term of $1 \leq \tau \leq Nmax$ to each of Equations 8 to 10.

The above-mentioned operations are performed for every input speech frame to determine a cumulative distance between a reference pattern and a continuous speech pattern as well as a segment cumulative pattern between a partial speech pattern and a partial reference pattern.

A correlation between a reference pattern ⌈NIWATORI⌋ and a word ⌈NIWATORI⌋ in a continuous speech is studied below:

Common segment cumulative distances can be obtained between various combinations of partial reference pattern and input speech pattern, for example, a partial reference pattern ⌈NI⌋ in the reference pattern and a partial speech pattern ⌈NI⌋ in the continuous spoken input, a partial reference pattern ⌈NIWA⌋ in the reference pattern and a partial speech pattern ⌈NIWA⌋ in the continuous spoken input and so on. The calculation of very short segments such as phonemes may not be practical because it can only increase an amount of operations. Accordingly, it is preferred to detect a common segment of a word-level length or more for further calculation. Presetting a shortest length of a common segment Nmin makes it possible to obtain an optimal common segment according to the following procedure:

On the assumption that a frame $\tau$ is an end of a path at a time t, a matching degree (consistency) A (t, $\tau$, n) of a segment that precedes the frame $\tau$ by n ($n \geq Nmin$) can be determined according to the following equation:

Mathematical Expression 13

$$A(t, \tau, n) = \{D(t, \tau, \tau) - D(t, \tau, \tau-n)\}/\{L(t, \tau, \tau) - L(t, \tau, \tau-n)\}$$

Consequently, among all frames $\tau$ and all segments n, an optimal common segment at the time t is defined by values $\tau^*$ and $n^*$ which assures a minimum matching A (t, $\tau$, n) determined according to the following equation:

Mathematical Expression 14

$$\tau^*, n^* = \arg \min_{Nmin \leq \tau \leq T, \; Nmin \leq n \leq \tau} A(t, \tau, n)$$

An optimal common segment and an optimal matching have the following expressions:

Mathematical Expression 15

$$(S(t, \tau^*, n^*), tau-n^*)-(t, tau^*)$$

Mathematical Expression 16

$$A(t, \tau^*, n^*)$$

A method for judging a common segment by a speech recognizing device is as follows:

(1) An optimal common segment at a time at which an optimal matching is minimal is considered as an optimal common segment among all segments.

A method for detecting a common segment in synchronism with a frame is as follows:

(2) A common segment that becomes a local minimum in a time series is considered as an optimal common segment.

The above-mentioned methods will be used in embodiments to be described below.

Figure 5:
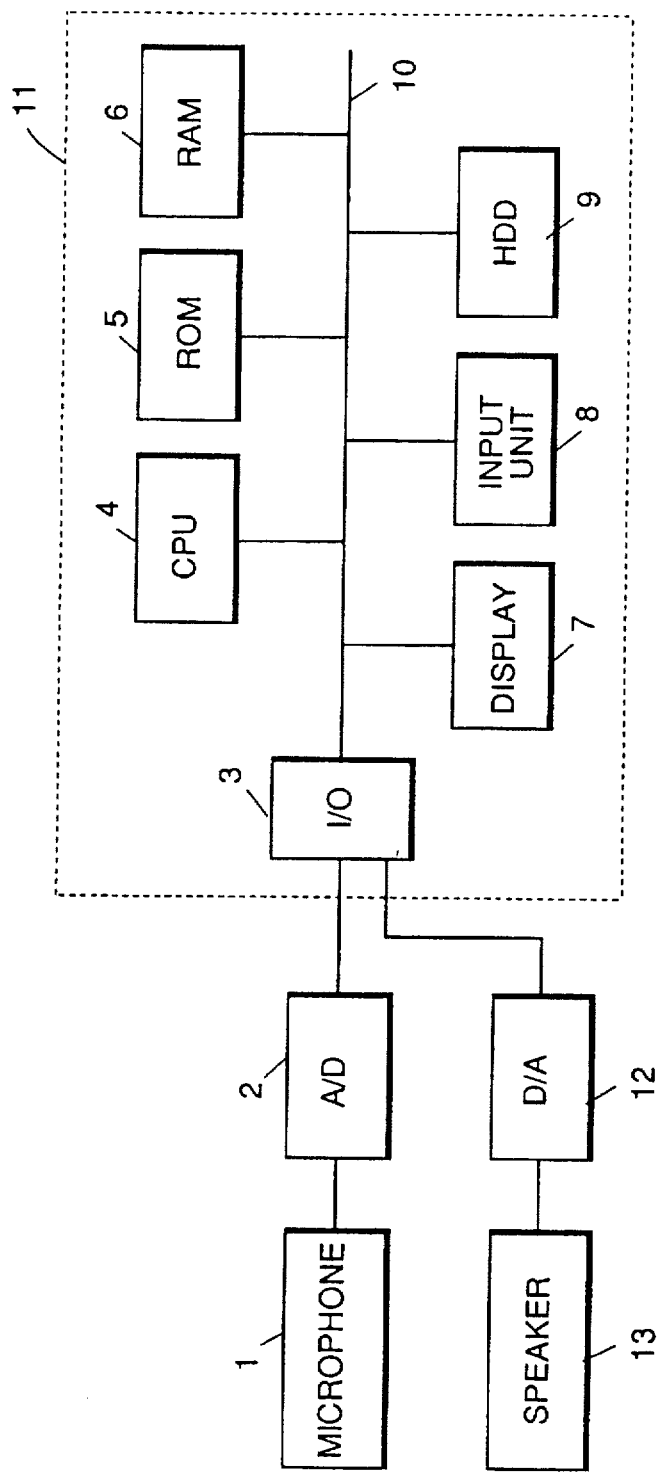
FIG. 5 is a block diagram showing a system of the first embodiment of the present invention.

FIG. 5 shows an exemplified system of a speech recognizing device that uses the above-described speech recognition method. In FIG. 5, numeral 11 designates an information processing device such as a personal computer.

A spoken input through a microphone 1 is converted into an analog electrical signal that is further converted into a digital signal by an analog-to-digital converter 2 and is then transferred to an input-output interface 3 of the personal computer 11. The digital speech signal is processed for example by Fourier analysis to extract therefrom a feature parameter of each frame of the speech signal. The feature parameter extracted in the mode of preparing a reference pattern is stored as a reference pattern in a hard disk storage (HDD) 9 under the control of a central processing unit (CPU) 4. At this time, characters indicating a content of the speech is input from an input unit such as a keyboard and are stored together with the related feature parameter. On the other hand, in the character recognizing mode, the digitized speech signal input in the personal computer 11 is converted into a feature parameter that is recognized as a speech by the CPU 4. More practically, the reference pattern, which has been stored by the above-mentioned speech recognizing method into the hard disk storage 9, and an input pattern obtained from the speech signal are compared with each other for matching in their feature parameters (distance) according to the continuous DP matching method.

Speech signals input at specified intervals are similarly processed for matching with corresponding reference signals. The matching results are sequentially stored in a random-access memory (RAM) 6 and accumulated results are also stored in the RAM 6. Furthermore, data on matched partial patterns according to the present invention is stored in the RAM 6. When an input speech pattern is recognized to match with a reference pattern, the matched reference pattern in the character form is displayed as a recognition result on a display 7. The speech is also output from a speaker 13 through a digital-to-analog converter 12.

The CPU 4 also detects a match of partial patterns (e.g., a word) between a reference pattern and an input speech pattern and indicates its recognition result on the display 7. The CPU 4 performs the above-mentioned sequential control of the component units according to a system program stored in a read-only memory (ROM) 5 as well as the above-mentioned processing operations for speech recognition according to a special program stored in the hard disk (HDD) 9.

The speech recognizing processing operations to be performed by the above-described system will be described referring to FIGS. 6 and 7.

Figure 6:
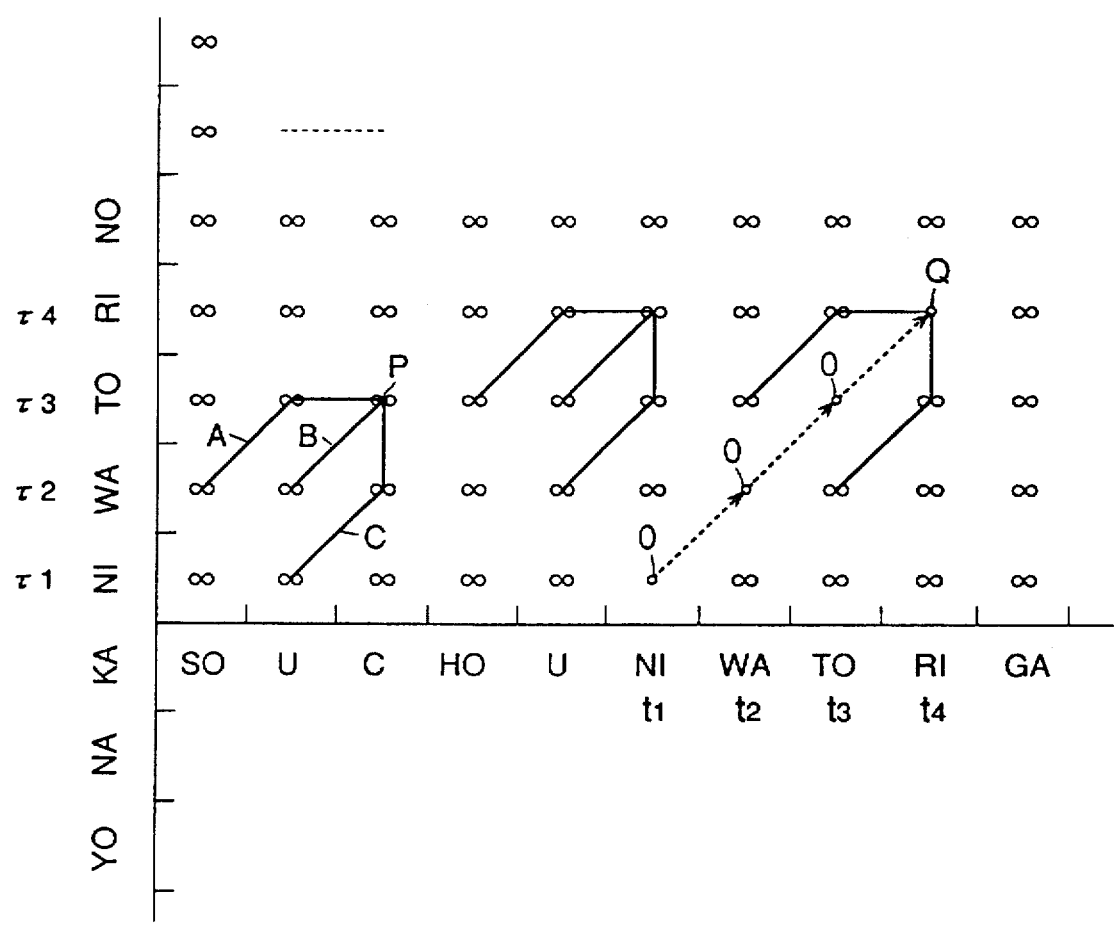
FIG. 6 is a view for explaining a speech recognition method relating to the first embodiment of the present invention.

FIG. 6 shows results of matching frames composing a reference pattern with frames composing an input speech pattern and how to combine objective frames (i.e., DP paths to be compared with each other). In FIG. 6, matching results are represented by symbol ⌈∞⌋ indicating no similarity of frames and by numeral 0 indicating similarity of frames. The notation, however, is made only for the sake of explaining and the practical matching results are expressed in the numerical form. In FIG. 6, the vertical axis represents a reference pattern and the horizontal axis represents an input speech pattern inputted in a time series.

Figure 7:
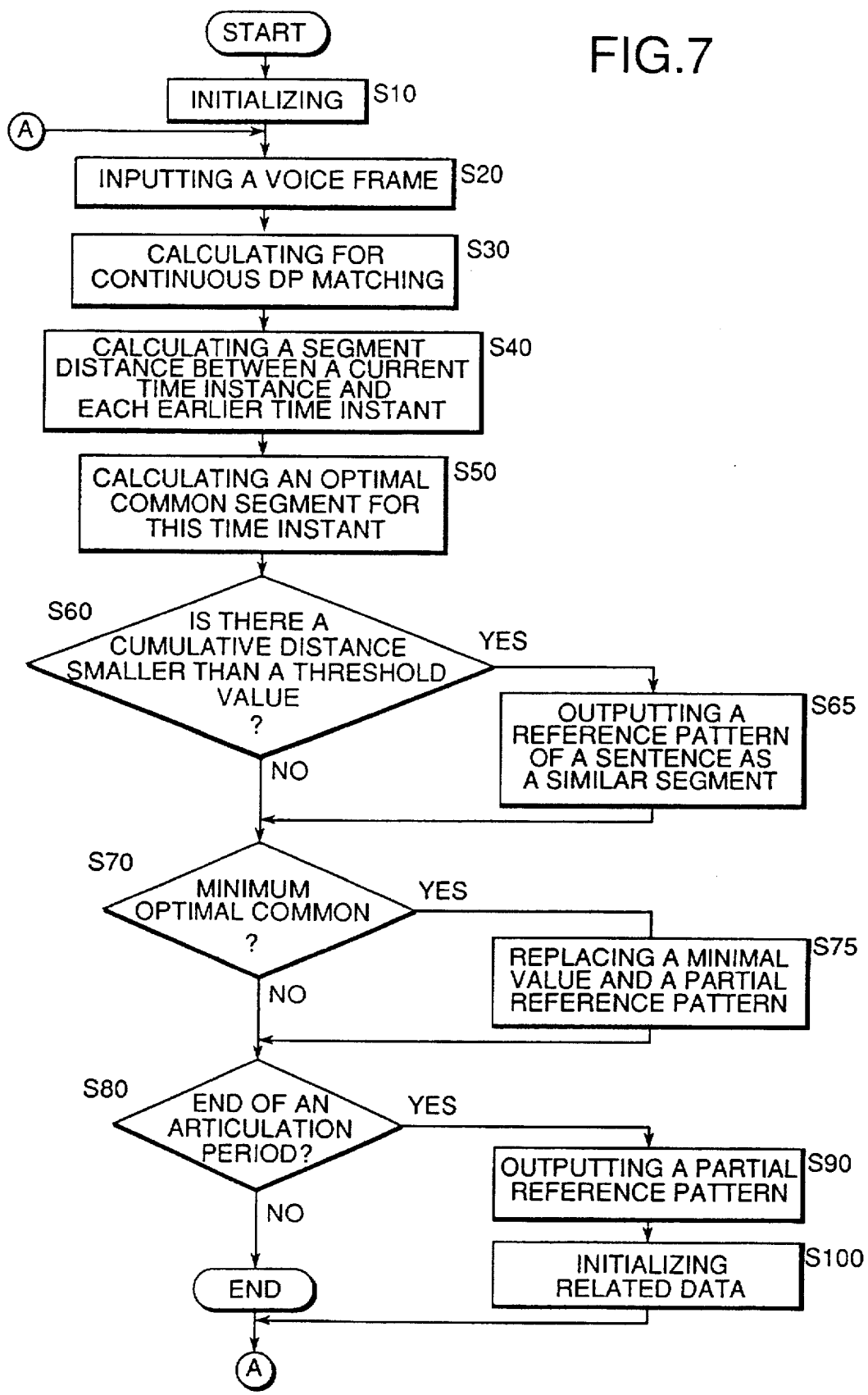
FIG. 7 is a flow chart of speech recognition procedure relating to the first embodiment of the present invention.

FIG. 7 shows a speech recognizing procedure to be performed by the CPU 4. This procedure is programmed by using programming language suitable for CPU 4 and stored in the hard disk (HDD) 9. For the sake of explanation, each processing step describes what to do. In this embodiment, the shortest common segment (Nmin=2) is preset for a word which length corresponds to two frames (characters) or more.

With an instruction of the speech recognizing mode, the CPU 4 starts the processing procedure of FIG. 7 and sets initial values necessary for calculation (Step S10). When an input speech to be recognized entered through the microphone 1, the personal computer 11 inputs the input speech pattern frame by frame and extracts a feature parameter therefrom (Step S20). In the example shown in FIG. 6, a frame ⌈SO⌋ is obtained. The CPU 4 compares reference pattern frames ⌈NI⌋, ⌈WA⌋... ⌈RI⌋ with the frame ⌈SO⌋ in the input speech pattern and stores the comparison results in respective (combination-depending) positions in the random-access memory RAM 5. Using the comparison results, the CPU 4 also calculates an initial value of a cumulative result for each combination position according to the initial conditional expression and stores each calculation result (Step S30).

The CPU 4 compares a cumulative distance of the reference pattern frame FRIJ with a threshold value. In this instance, the cumulative distance of the frame ⇌RI⌋ exceeds the threshold value and the reference pattern of the sentence is therefore judged not to match with the input speech pattern (Step S40).

At this instant of the time series, the number of frames of the reference pattern side is one that is smaller than the shortest common segment 2. Therefore, the CPU only passes steps S50 to S100 and waits the second input-speech frame. Having received the second input-speech frame ⌈U⌋, CPU 4 compares it with each frames of the reference pattern and stores the comparison results in respective positions reflecting those shown in FIG. 6 in the random-access memory RAM 6. The CPU 4 forms a judgment on the sentence in the same manner as described before (Step S30 to S40).

At this time, the number of the input speech frames is two and, hence, the CPU 4 compares the reference pattern segment ⌈NIWA⌋ with the input-speech pattern segment ⌈SOU⌋ and stores the comparison result in the random-access memory RAM 6. The comparison result is stored as a temporary minimal value (Step S60→Step S80). With the third input-speech frame ⌈CHI⌋ input, the CPU 4 determines a cumulative distance at a position P shown in FIG. 6 by using the restricted gradient of FIG. 2 according to Equation 5. Namely, the minimum of three cumulative distance values defined by paths A, B and C respectively according to Equation 5 is determined as a cumulative distance value at position P. Consequently, the path having this cumulative distance value is defined as an optimal path, i.e., a sequence of combined frames which might be most likely at this instant. The CPU 4 calculates a cumulative distance value for a combination of an input speech frame ⌈CHI⌋ with a reference pattern frame ⌈RI⌋ according to Equation 5 (Step S30).

The CPU 4 determines a distance of a segment having a length not less than two-frames existing backward in the time series from the point P by calculating a difference between two cumulative distances at the respective time instants and stores the calculation result in the random-access memory RAM 6 (Step S40). At this time, the CPU 4 obtains two distance values of two segments which have respective frame lengths 2 and 3 and stores the minimum of two values as an optimal segment distance at this position (Step S50). The CPU 4 also compares the minimal value of the new optimal segment with the minimal value of the preceding optimal segment and stores the new optimal distance as a current minimal value (Step S75).

The CPU 4 performs the similar operations on every new frame input to determine a distance on a reference pattern, a distance of a segment defined backward starting from the current instant and an optimal segment distance in sequence. Every specified number of frames, for example, every 5 frames, a partial reference pattern having the optimal segment distance is indicated as a recognition result on the display 7 and a temporary minimal value is set for next processing (Steps S80→S90→S100).

In the example of FIG. 6, a cumulative distance of a path is calculated from the time instant t1 to the time instant t4 at which a cumulative distance value at a sentence end position Q becomes smaller than a specified threshold and, at the same time, a reference pattern ⌈NIWATORI⌋ is displayed as a recognition result on the display 7 (Step S60→Step S65).

As described above, the shown embodiment is capable of performing conventional continuous DP matching and, at the same time, of calculating a distance of a specified length segment starting from the current instant and detecting a match of a partial reference pattern with a partial input-speech pattern. This makes a user free from specifying a segment to be calculated as the prior art device requires.

Embodiment No. 1

The first embodiment can realize the following variations:

1) A result of recognizing a spoken sentence can be output by using any desired kind of output unit such as a display unit, speaker, printer and so on.

2) Although a reference pattern used in the above-described embodiment is composed of an objective or words, it may be a spoken partial sentence having a phrase-level length.

Embodiment No. 2

A topic may have an important keyword (e.g., a proper noun which may be supposed to frequently appear and to sound longer than other common word. Accordingly, a specific word used in a topic is assumed to possess the following specific features:

It appears two or more times in a topical speech.

It is long enough length.

On the basis of the above-mentioned assumption, many segments containing the important word can be detected by extracting phonemically similar segments of enough length in a speech.

However, common words such as function words, adverb and conjunction may also satisfy the above-mentioned conditions and they may be inevitably contained in segments extracted by phonemic similarity. Therefore, it is necessary to exclude such unnecessary information by post-processing.

Accordingly, the second embodiment is intended to detect a partial sentence that appears several times in a specified duration of a speech by using the method for detecting a partial sentence composed of words, which was described for the first embodiment. The application of the embodiment can detect only a keyword being cleaned off attributing thereto adverb, conjunction and other unnecessary words.

The second embodiment is similar in its system to the first embodiment but differs from the latter by the following point:

The first embodiment uses previously prepared reference patterns which content can not be changed. On the contrary, the second embodiment uses a speech pattern of a specified length extracted from an input speech as a reference pattern which may vary accordingly with an input speech keeping the specified pattern-length as unchanged.

Figure 8:
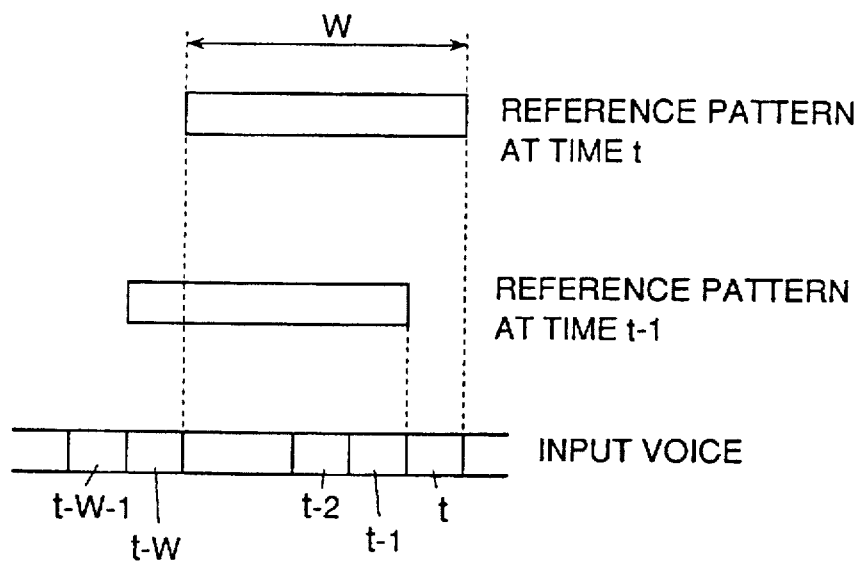
FIG. 8 shows a reference pattern of a second embodiment of the present invention.

Referring to FIG. 8, a reference pattern used in practice for DP matching at an instant t−1 supposed as the current time is a feature parameter series extracted from an input speech from a last instant t−W−1 to the instant t−1, i.e., an input speech pattern. When a new part of speech is inputted, this embodiment erases the data obtained at the instant t−W−1 from the reference pattern and adds new data obtained at the instant t, thereby maintaining a fixed length W of data stored.

Figure 9:
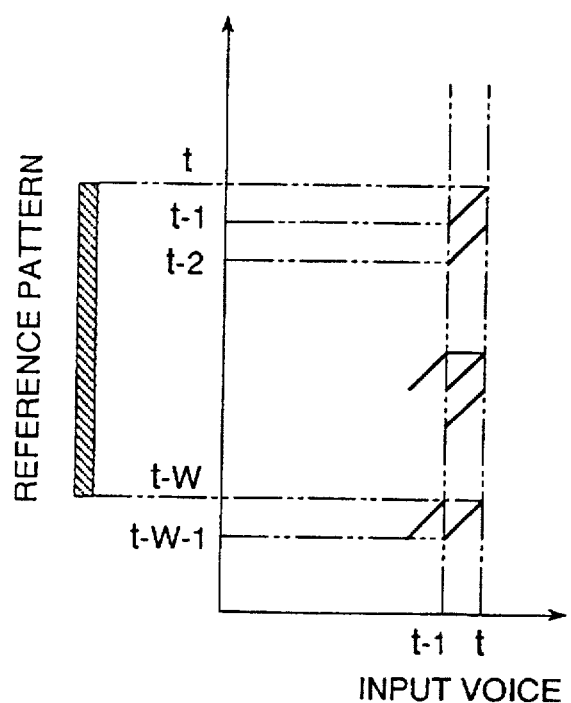
FIG. 9 is a view for explaining a processing according to the second embodiment of the present invention.

In applying the above-mentioned reference pattern, how to calculate cumulative distances at both ends of the reference pattern must be devised. In the shown embodiment, a path of the reference pattern is set to have a start position and an end position in the form shown in FIG. 9. The other calculating methods are the same as those of the first embodiment.

Figure 10:
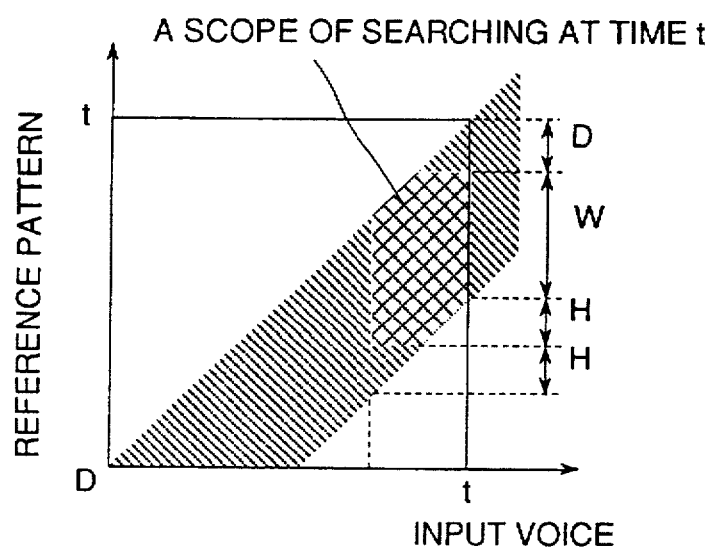
FIG. 10 is a view for explaining a processing according to the second embodiment of the present invention.
Figure 11:
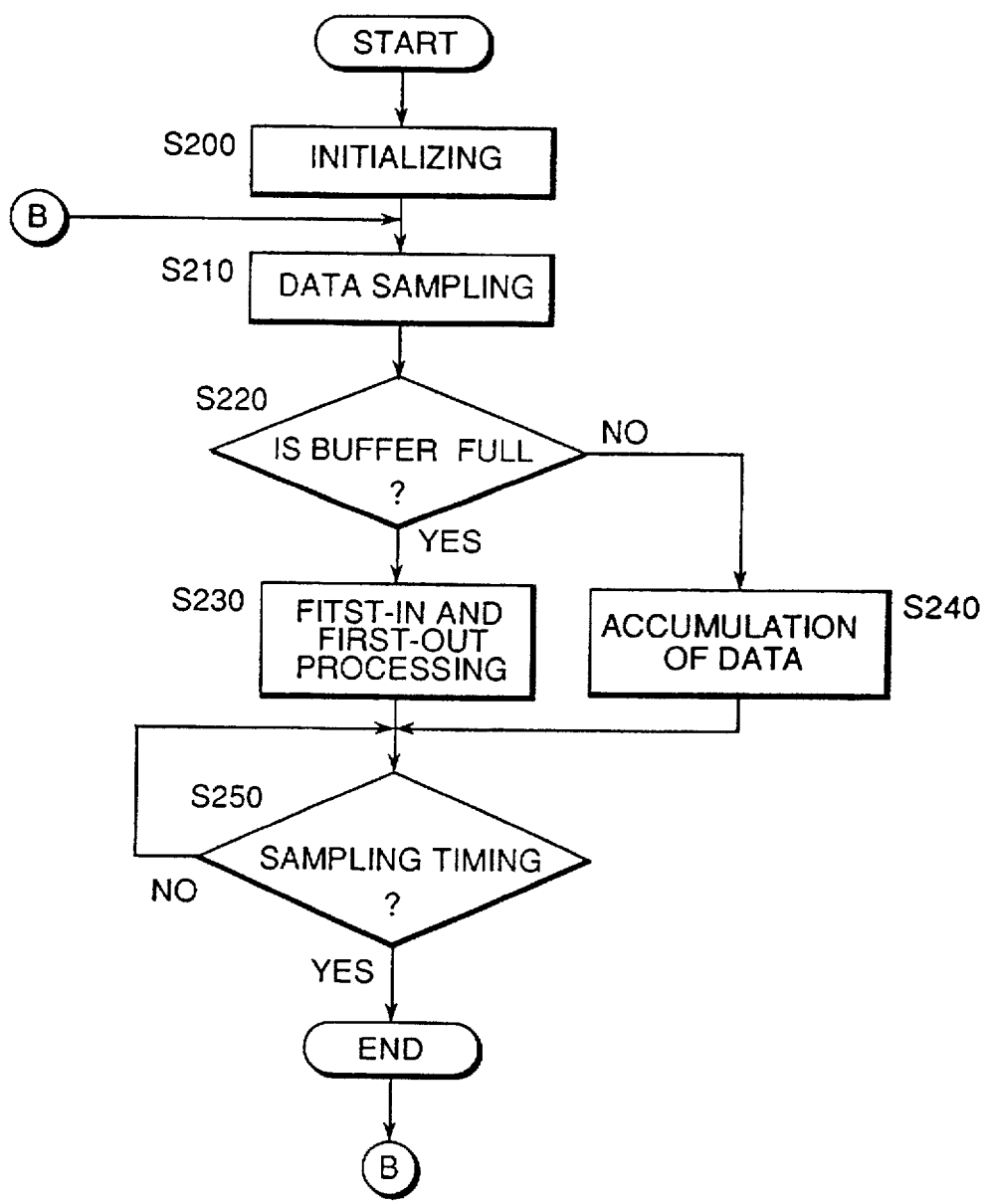
FIG. 11 is a flow chart of speech recognition procedure according to the second embodiment of the present invention.

A segment of a reference pattern, which is similar to a recognizable segment of an input speech pattern ending at an instant t of the time series, is searched within an area shown in FIG. 10, where character W designates the maximal length of the reference pattern and character H designates the maximal length of the similar segment. In FIG. 10, character D denotes a delay time required not to detect a segment ending at the instant t. If D=O, said segment itself is always detected. Searching is conducted usually in an area shown by hatching.

FIG. 7 shows a processing procedure for inputting data on which the central processing unit (CPU) 4 performs the above-mentioned calculating operations. When speech data sampling began, input data (i.e., speech feature parameter) is accumulated in sequence in a buffer RAM 6 for storing reference patterns until the buffer becomes full (Step S210→Step S240). When the buffer was filled up, the speech feature parameter stored in the top place is erased and an input data is added to the last place in the buffer just like a FIFO (first-in first-out) type memory works (Step S210→Step S220→Step S230).

Detection of a partial sentence is conducted by thus changing the reference pattern. The calculation by the method described in the first embodiment results in that a word frequently appearing in a specified duration W may have a smaller cumulative segment distance than any other word. Consequently, the smaller cumulative segment distance is selected and the frequently appeared word is output as a similar word.

The second embodiment can also realize the following modification:

1) The result of detecting a partial sentence by using a fixed reference pattern as described in the first embodiment is stored in the random-access memory (RAM) 6. Whenever a new partial sentence is detected, the reference is made to the content of the RAM 6 for checking whether the same partial sentence is stored therein. If there is the same partial sentence, the frequency of occurrence of the partial sentence is counted and said frequently used partial sentence is detected. This method, however, is inferior to the first method of the second embodiment if it is used for detecting only the frequently appearing partial sentences without counting the frequency of their occurrence. In this case, the first method is faster in processing and uses a smaller memory space.

Embodiment No. 3

Figure 12B:
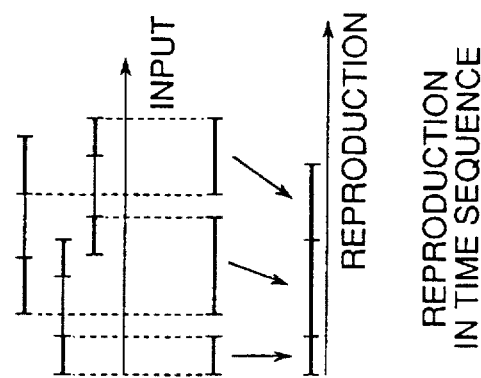
FIGS. 12A and 12B are views for explaining a processing according to the third embodiment of the present invention.
Figure 12A:
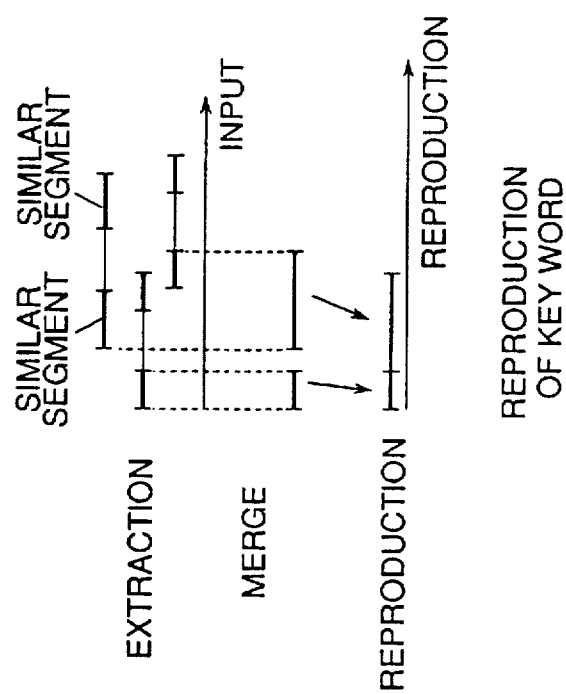

Similar words (segments) extracted by the similar word extracting method applied in the first embodiment may overlap each other in the time series or have a space between words as shown in FIGS. 12A and 12B. Consequently, the extracted similar words may be hard to hear if they were directly reproduced.

Accordingly, the third embodiment is intended to merge similar words having a gap therebetween or overlapping each other in the time series and then process them to be reproduced in sequence.

Figure 13:
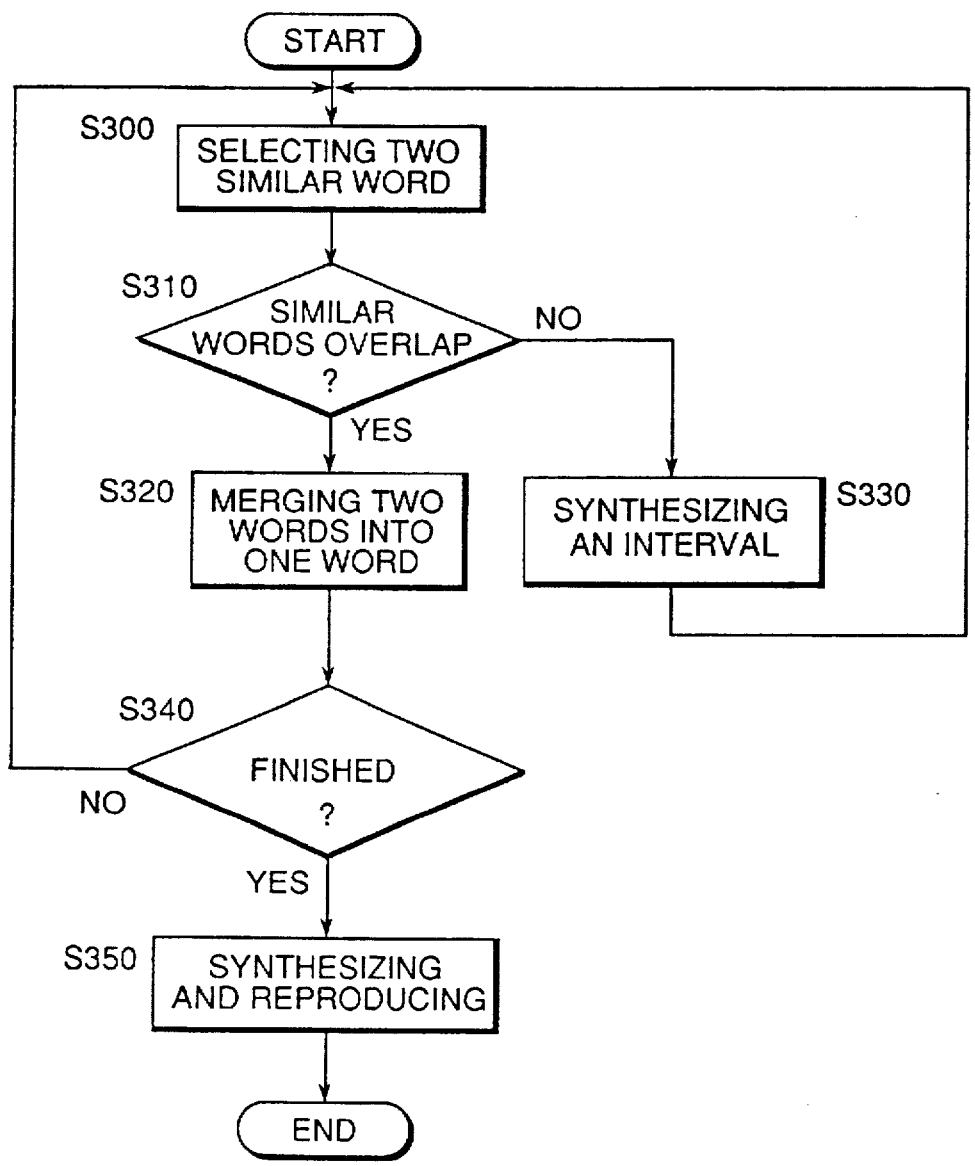
FIG. 13 is a flow chart of speech recognition procedure according to the third embodiment of the present invention.

FIG. 13 shows a processing procedure that the central processing unit (CPU) 4 performs to achieve the above-mentioned object. The CPU 4 stores a first extracted similar word as an initial synthesized similar word in the random-access memory (RAM) 6. When a second similar word was obtained, the CPU 4 examines whether the similar words overlap each other (apart from each other) by comparing the positions of start and end positions of the similar words on the time axis of the initial synthesized word (Step S300→Step S310). If these two similar words overlap each other, the overlap part of one of two words is erased and then two words are merged (Step S320). When the two similar words are apart from each other, the start point of the proceeding word (i.e., being behind in time series) is combined to the end point of the preceding word (Step S330).

The synthesized similar word thus prepared is stored in place of the precedent one in the RAM 6. Whenever a new similar word is obtained, the above-mentioned procedure is repeated to synthesize one similar word by eliminating an overlap and a space between similar words. After repeating the procedure by the specified number of times or for a specified period (Step S340), the CPU 4 causes the synthesized similar word to be reproduced through the speaker 13 (Step S350). The procedure for synthesizing and reproducing similar words in sequence is further repeated.

Embodiment No. 4

In practice, input speech scarcely match with reference patterns of unit sentences which were prepared in the first embodiment. Therefore, a partial sentence is detected and output. In this case, there may occur such a problem that a pause in a spoken sentence is hard to find if a partial sentence is separately output.

Figure 14:
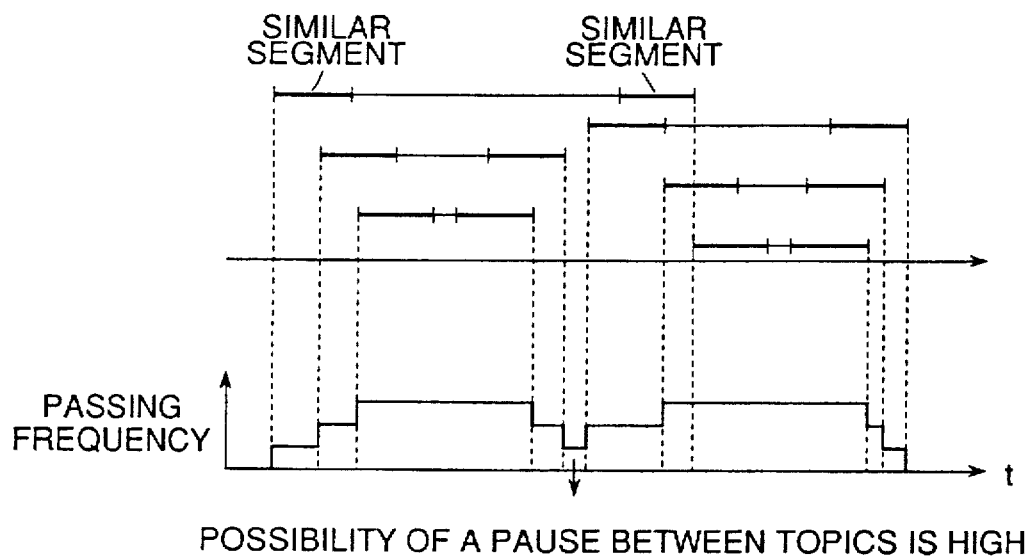
FIG. 14 is a view for explaining a processing according to the fourth embodiment of the present invention.

On the basis of the fact that different topics use different word sets, this embodiment detects similar segments for a speech containing a plurality of topics by the method applied in the first embodiment. It may be supposed that there are many similar segments in the same topic whereas similar segments are hardly found between different topics. The passing frequency of lines combining two corresponding segments at each instant of time series may be particularly low at a boundary zone between the topics as shown in FIG. 14. Therefore, the boundary between two topics may be found with a high probability in the time zone wherein the passing frequency of tie lines is locally decreased.

Accordingly, the embodiment counts the tie-line passing frequency for the detected similar words and compared it with a specified threshold. The boundary between two topics is decided at a point where the count result is below the threshold.

Figure 15:
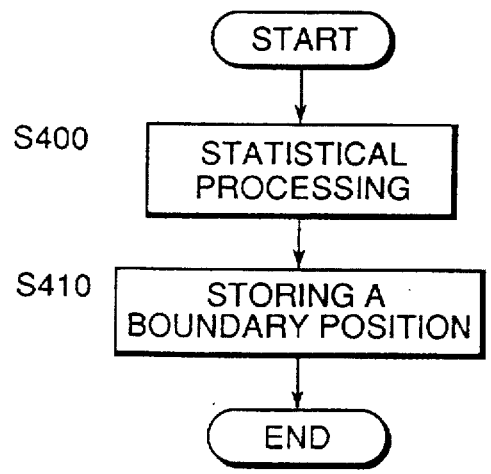
FIG. 15 is a flow chart of speech recognition procedure according to the fourth embodiment of the present invention.

For this purpose, the CPU 4 performs the procedure shown in FIG. 15. When the CPU 4 detected a similar word by the same method that is used in the first embodiment, it generates a rectangular image having long sides whose length is equal to a distance (time length) from a s tart point to an end point of the similar word and having short s ides of a specified length in a two-dimensional space (having a time axis and a passing frequency axis) on the random-access memory RAM 6. This rectangular image raises every time that a similar word is detected. The time at which the boundary between the topics exists can be detected on this graph by comparing the frequency of use at instants of the time series (the number of dots in the passage-frequency axis direction) with a threshold (Step S400). This boundary point time is stored in the RAM 6 (Step S410).

The fourth embodiment can also be adapted to realize the following:

1) Although similar segments are accumulated by image processing method in the shown example, it is also possible to determine the passing frequency at every instant by numerical calculation.

As described above, the speech recognition device and method according to one aspect of the present invention, can recognize words during speech recognition of a sentence and can eliminate the need for manually designating a partial reference pattern (template) as the prior art requires.

The speech recognition device and method according to the present invention, can realize word-by-word recognition omitting character recognition by increasing the number of frames to be extracted as partial reference patterns (templates) more than the specified number.

This may reduce a processing time, saving a memory capacity.

The speech recognition device and method according to another aspect of the present invention, can obtain a partial sentence composed of a plurality of the same words included in an input speech pattern of a specified length as a result of partial speech recognition by preparing a reference pattern from an input speech pattern. Repeatedly used separate words may be thus obtained and used as important key words.

The speech recognition device and method according to the present invention, can use a FIFO type memory as a buffer, that may save a memory capacity.

The speech recognition device and method according to another aspect of the present invention, can synthesize results of partial speech pattern recognition into one synthesis which content may be handled as a summary of a speech or a group of key words.

The speech recognition device and method according to another aspect of the present invention, enable hearer to recognize by ears a speaker's speech summary by means of voice reproduction of the synthesized content.

The speech recognition device and method according to yet another aspect of the present invention, which are defined in claim 9, can automatically detect a break in a speaker's speech.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A speech recognizing device for sequentially performing frame-by-frame calculation of a distance between an input speech pattern extracted from an input speech signal and a reference sentence pattern by continuous dynamic programming method, accumulating results of the frame-by-frame distance calculations in the direction from a starting position to an ending position of the reference pattern and recognizing the input speech pattern on the basis of the accumulated results, the speech recognizing device comprising:

first arithmetic processing means for calculating a difference of the cumulative distance at each current frame within the starting position and the ending position of the reference pattern from the cumulative distance at a preceding frame nearer to the starting position of the reference pattern, considering the current frame as an end point of the current partial reference pattern; and second arithmetic processing means for detecting a minimal differential value among the calculated differential values and for determining a partial reference pattern corresponding to the detected minimal differential value as a result of recognizing one of partial speech patterns composing the input speech pattern.

2. A speech recognizing device as defined in claim 1, wherein the number of frames included between the end point and the start point of the partial reference pattern is not less than a predetermined quantity.

3. A speech recognizing method which, by using a speech recognizing devices, performs sequential frame-by-frame calculation of a distance between an input speech pattern extracted from an input speech signal and a reference sentence pattern by continuous dynamic programming method, comprising:

accumulating the frame-by-frame distance calculation results in the direction from a starting position to an ending position of the reference pattern, considering the current frame as an end point;

determining the reference pattern as a recognition result of a part of the input speech pattern;

detecting a minimal differential value among the calculated differential values; and outputting a partial reference pattern corresponding to the detected minimal differential value as a result of recognizing one of partial speech patterns composing the input speech pattern.

4. A speech recognizing method as defined in claim 3, further comprising specifying a quantity below which the number of frames included within the end point and the start point of the partial reference pattern does not fall.

5. A speech recognizing device for sequentially performing frame-by-frame calculation of a distance between an input speech pattern extracted from an input speech signal and a reference sentence pattern by continuous dynamic programming method, accumulating results of the frame-by-frame distance calculations in the direction from a starting position to an ending position of the reference pattern and recognizing the input speech pattern on the basis of the accumulated results, the speech recognizing device comprising:

first arithmetic processing means for calculating a difference of the cumulative distance at each current frame within the starting position and the ending position of the reference pattern from the cumulative distance at a preceding frame nearer to the starting position of the reference pattern, considering the current frame as an end point of the current partial reference pattern; and second arithmetic processing means for detecting a minimal differential value among the calculated differential values and for determining a partial reference pattern corresponding to the detected minimal differential value as a result of recognizing one of partial speech patterns composing the input speech pattern, and, is capable of making the reference pattern be an input speech pattern of a specified length W from a current time instant toward a prior time instant.

6. A speech recognizing device as defined in claim 5, further comprising a buffer for storing the input speech pattern of the specified length W by serially accumulating therein one frame of a new input pattern and at the same time by erasing oldest one of stored input pattern frames therefrom every time when new input speech pattern is input.

7. A speech recognizing device for sequentially performing frame-by-frame calculation of a distance between an input speech pattern extracted from an input speech signal and a reference sentence pattern by continuos dynamic programming method, accumulating results of the frameby-frame distance calculations in the direction from a starting position to an ending position of the reference pattern and recognizing the input speech pattern on the basis of the accumulated results the speech recognizing device comprising:

first arithmetic processing means for calculating a difference of the cumulative distance at each current frame within the starting position and the ending position of the reference pattern from the cumulative distance at a preceding frame nearer to the starting position of the reference pattern, considering the current frame as an end point of the current partial reference pattern; and second arithmetic processing means for detecting a minimal differential value among the calculated differential values and for determining a partial reference pattern corresponding to the detected minimal differential value as a result of recognizing one of partial speech patterns composing the input speech pattern, and, is capable of synthesizing a plurality of the recognized partial speech patterns in a time series with no spacing and no overlapping.

8. A speech recognizing device as defined in claim 7, further comprising means for outputting synthesized recognition results as a voice signal.

9. A speech recognizing device for sequentially performing frame-by-frame calculation of a distance between an input speech pattern extracted from an input speech signal and a reference sentence pattern by continuous dynamic programming method, accumulating results of the frame-by-frame distance calculations in the direction from a starting position to an ending position of the reference pattern and recognizing the input speech pattern on the basis of the accumulated results the speech recognizing device comprising:

first arithmetic processing means for calculating a difference of the cumulative distance at each current frame within the starting position and the ending position of the reference pattern from the cumulative distance at a preceding frame nearer to the starting position of the reference pattern, considering the current frame as an end point of the current partial reference pattern;

second arithmetic processing means for detecting a minimal differential value among the calculated differential values and for determining a partial reference pattern corresponding to the detected minimal differential value as a result of recognizing one of partial speech patterns composing the input speech pattern;

counting means for counting a passing frequency at a time axis of the partial voice pattern recognition results; and topics boundary detecting means for determining a boundary between topics by detecting a time point where the counted passing frequency decreases below a specified threshold value.

\* \* \* \* \*